(12) United States Patent
Tounai et al.

(10) Patent No.: US 6,684,128 B1
(45) Date of Patent: Jan. 27, 2004

(54) ROBOT AND METHOD OF CONTROLLING THE ROBOT

(75) Inventors: Shuichi Tounai, Kitakyushu (JP); Hiroyuki Hamamoto, Kitakyushu (JP); Koichi Yamaguchi, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/110,778

(22) PCT Filed: Oct. 26, 2000

(86) PCT No.: PCT/JP00/07552

§ 371 (c)(1),
(2), (4) Date: Apr. 29, 2002

(87) PCT Pub. No.: WO01/30544

PCT Pub. Date: May 3, 2001

(30) Foreign Application Priority Data

Oct. 28, 1999 (JP) ............................................. 11-307739

(51) Int. Cl.[7] .............................................. G06F 19/00
(52) U.S. Cl. ................... 700/245; 700/88; 700/164; 700/262; 700/247; 700/900; 318/568.14; 318/568.22; 318/572; 318/574; 701/23
(58) Field of Search ................................ 700/245, 247, 700/88, 164, 262, 900; 318/568.14, 568.22, 572, 574; 701/23

(56) References Cited

U.S. PATENT DOCUMENTS 4,706,004 A * 11/1987 Komatsu et al. ....... 318/568.14
5,353,386 A * 10/1994 Kasagami et al. .......... 700/247

OTHER PUBLICATIONS

FANUC, S—500, 1997, Internet, pp. 1–2.*
Hace et al., Robust motion control algorithm for brushless direct drive motor, 2000, IEEE, pp. 554–559.*
Patent Abstracts of Japan, Publication No. 09–149958, filed on Jun. 10, 1997. See PCT search report.
Patent Abstracts of Japan, Publication No. 5–146978, filed on Jun. 15, 1993. See PCT search report.

* cited by examiner

Primary Examiner—William A. Cuchlinski, Jr.
Assistant Examiner—McDieunel Marc
(74) Attorney, Agent, or Firm—Westerman, Hattori, Daniels & Adrian, LLP

(57) ABSTRACT

A robot capable of being operated at a high-speed by the full use of a power of a servo-motor, including a motor and a speed reducer, wherein the motor drives the robot through the speed reducer, and the speed reducer is a variable speed reducer capable of varying a reduction ration thereof while the robot is operating reproducibly.

5 Claims, 2 Drawing Sheets

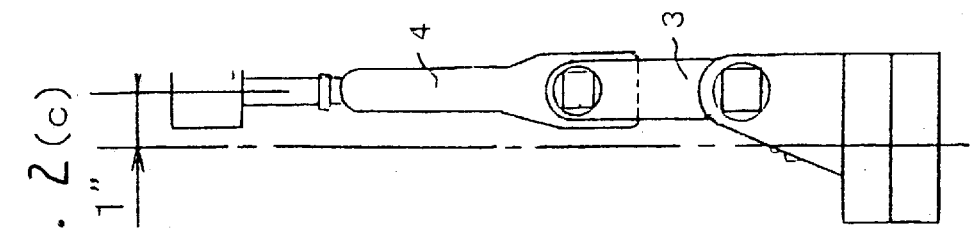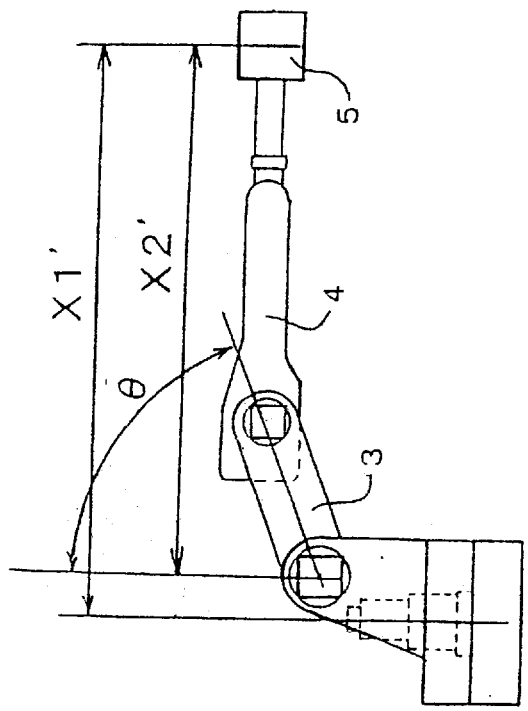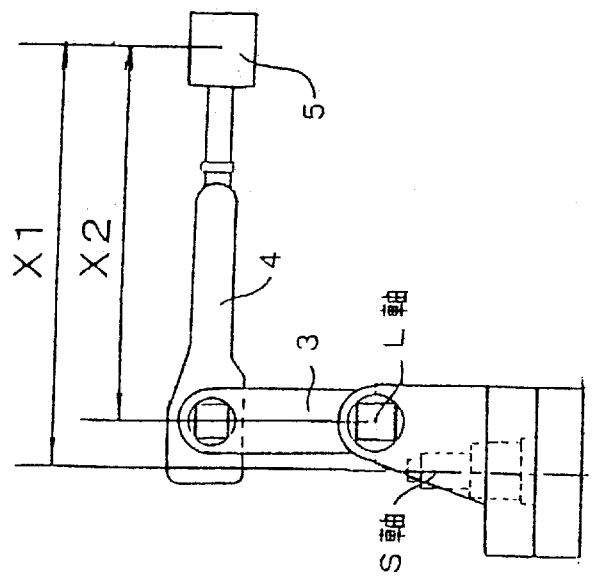

ROBOT AND METHOD OF CONTROLLING THE ROBOT

BACKGROUND OF THE INVENTION

1. Field of the Invention

The present invention relates to a robot that is driven by a motor via a speed reducer, and in particular, a vertical multi-joint robot.

2. Description of the Related Arts

Nowadays, the mainstream of so-called vertical multi-joint robots for industrial uses resides in electric robots that are driven by servomotors. Generally, because servomotors have a higher rotation speed and a lower torque than the rotation speed and torque which are requested for robots, a speed reducer intervenes between a robot and a servomotor. Although a cyclone speed reducer and a harmonic speed reducer are adopted as such a speed reducer, the reduction ratio is fixed in either case, and the output of the servo motor is reduced at a constant reduction ratio.

As an exceptional example, an electric robot is disclosed by Japanese Unexamined Patent Publication No. Sho-64-51285, which is provided with means for varying the reduction ratio between a joint mechanism and the speed reducer. However, in a robot of the above-described invention, that is, in a direct teaching robot in which teaching is carried out by an operator operating the robot with its arms, the reduction ratio is changed in teaching and in playback operations, wherein the reduction ratio in the playback operation is fixed at a constant value.

However, in this type of conventional vertical multi-joint robot, a reduction ratio suited from such a maximum load is determined on the basis of a load status applied to the servomotor and is maximized with the design maximum load mass attached onto the robot, that is, a status where the rotational inertia is maximized when the arm is swung extremely outside in the case of swinging on the horizontal surface, and a status where a moment resulting from gravity with the arm horizontally shifted down in the case of swinging of a forward and backward swinging axis.

Accordingly, where the robot is used with a load mass not reaching the maximum load mass, or where the robot is used in a state where the moment due to a rotational inertia and gravity is smaller than the maximum, a problem occurs in that a sufficient operation speed cannot be obtained while the power of the servomotor becomes excessive. That is, a problem occurs in that a speed, which could be obtained if a reduction ratio responsive to a load is selected, cannot be obtained.

SUMMARY OF THE INVENTION

Therefore, it is an object of the present invention to provide a robot capable of operating at a high speed by fully utilizing the power of a servomotor.

In order to solve the above-described and other problems, a robot according to a first aspect of the invention, which is driven by a motor via a speed reduce which is made into a speed-varying reducer whose reduction ratio is varied during a playback operation of the above-described robot. The robot according to a second aspect of the invention varies the reduction ratio of the above-described speed reducer in response to the degree of an angle of the arm of the robot. The robot according to the third aspect of the invention varies the reduction ratio of the above-described speed reducer in response to the size of a load mass attached to the tip end of the arm of the above-described robot. The robot according to the fourth aspect of the invention varies the reduction ratio of the above-described speed reducer in response to the intensity of a rotational inertia around the drive shaft of the above-described robot. Also, a method for controlling a robot, which is driven by a motor via a variable speed reducer whose reduction ratio is variable during a playback motion, according to the sixth aspect of the invention comprises the steps of teaching the robot appointed operation courses; acquiring fluctuations in a rotational inertia around the drive shaft of the above-described robot and in an angle of the above-described robot arm; and determining a schedule for varying the above above-described speed reducer by the fluctuations in a load of the above-described motor resulting from the fluctuations in the above-described rotational inertia and angle of the above-described arm. The robot according to the seventh aspect of the invention comprises the steps of teaching the above-described robot appointed operation courses by an off-line teaching device to acquire fluctuations in the rotational inertia around the drive shaft of the above-described robot and angle of the above-described robot arm by simulation brought about by the above-described off-line teaching device; and determining a schedule for varying the reduction ratio of the above-described speed reducer in compliance with the fluctuations in the load of the above-described motor resulting from the above-described rotational inertia and angle of the above-described arm.

BRIEF DESCRIPTION OF THE DRAWINGS

FIGS. 2(a), 2(b) and 2(c) are views describing a vertical multi-point robot showing the preferred embodiment of the invention, wherein FIG. 2(a) shows a status where the lower arm 3 is erected and the upper arm 4 is made horizontal, FIG. 2(b) shows a status where the lower arm 3 is shifted down forward from the erected status by an angle θ, and FIG. 2(c) shows a status where both the lower arm 3 and the upper arm 4 are erected.

DETAILED DESCRIPTION OF THE PREFERRED EMBODIMENTS

Figure 1:
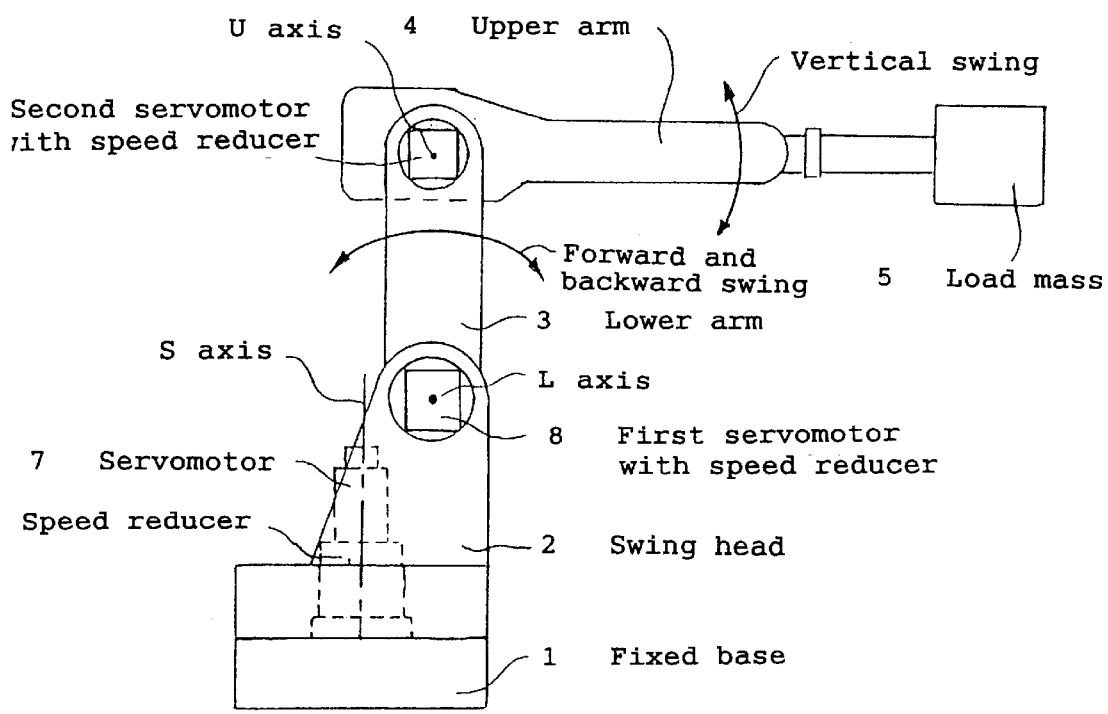
FIG. 1 is a conceptual view of a vertical multi-joint robot showing a preferred embodiment of the invention.

Hereinafter, a description is given of a preferred embodiment of the invention on the basis of the accompanying drawings.

FIG. 1 is a conceptual view of a vertical multi-joint robot. In the drawing, 1 denotes a fixed base. A swing head 2 is attached to the fixed base 1 so as to freely swing around a swing axis (S axis). The lower arm 3 is attached to the upper portion of the swing head 2 so as to freely swing forward and backward around a forward and backward swinging axis (L axis). The upper arm 4 is attached to the upper portion of the lower arm 3 so as to freely swing around a vertical swinging axis (U axis). 5 denote a load mass that is attached to the tip end of the upper arm 4. Herein, the load mass 5 corresponds to a mass of an end effecter, which is attached to the tip end of the robot.

6 denotes a speed reducer attached to the swing head 2. The output portion thereof is coupled to the fixed based 1, and the input portion thereof is fixed at a servomotor 7. The swing head 2 is driven and swiveled around the S ahaft by the servomotor 7 and speed reducer 6.

8 denotes the first servomotor with a speed reducer, which is fixed on the swing head 2, and the output portion thereof is coupled to the lower arm 3 and drives and swings the lower arm 3 around the L axis.

9 denotes the second servomotor with a speed reducer, which is fixed on the lower arm 3, and the output portion thereof is coupled to the upper arm 4, and drives and swings the upper arm 4 around the L axis.

The speed reducer 6, the first servomotor 7 with a speed reducer, and the second servomotor 8 with a speed reducer are provided with a mechanism by which the reduction ratio is changed over to two ratios (high and low) during playback of the robot by an instruction of a robot controlling apparatus (not illustrated). The mechanism for changing the reduction ratios may be selected among publicly known mechanisms, for example, a mechanism in which engagements of gears are changed, a mechanism in which two sets of planet gears are combined, and a mechanism in which engagements of pulleys are changed.

Here, a description is given of actions of the robot. FIGS. 2(a), 2(b) and 2(c) are views describing three types of statuses of the robot, wherein FIG. 2(a) shows a status where the lower arm 3 is erected and the upper arm 4 is made horizontal, FIG. 2(b) shows a status where the lower arm 3 is shifted down forward from the erected status by an angle θ, and FIG. 2(c) shows a status where both the lower arm 3 and the upper arm 4 are erected.

The distance from the S axis to the center of gravity of the load mass 5 is X1 in the status shown in FIG. 2(a). However, where the lower arm 3 is shifted down as in FIG. 2(b), the distance becomes large to be X'1. Also, the centers of gravity of the lower arm 3 and the upper arm 4 are made farther from the S axis. Therefore, in the status shown in FIG. 2(b), the rotational inertia around the S axis becomes larger than in the status shown in FIG. 2(a).

To the contrary, in the status shown in FIG. 2(c), the distance from the S axis to the center of gravity of the load mass 5 becomes small as shown with X1", and the centers of gravity of the lower arm 3 and upper arm 4 approaches the S axis, wherein the rotational inertia around the S axis is decreased.

As the rotational inertia around the S axis increases, the load of the servomotor 7 is accordingly increased in speed acceleration and deceleration. As the rotational inertia around the S axis decreases, the load is decreased. Therefore, the reduction ratio of the speed reducer 6 is varied in response to the statuses of the lower arm 3 and upper arm 4 by instructions of the robot controlling apparatus. That is, where the angles of the lower arm 3 and the upper arm 4 are in a range where the rotational inertia around the S axis exceeds an appointed value, a larger reduction ratio is selected, and in a range where the rotational inertia around the S axis becomes smaller than the appointed value, a smaller reduction ratio is selected.

Further, the rotational inertia around the S axis is calculated while taking the weight of the lower arm 3 and the upper arm 4 into consideration, and the reduction ratio may be selected in compliance with the size of the result.

In addition, the reduction ratio maybe selected or determined in compliance with the size of the load mass 5. Generally, the larger a robot becomes, the larger the maximum mass, that is, the conveyable mass and range of movement of an attachable end effecter become. The maximum speed and maximum acceleration of the robot then tends to become smaller. There are cases where a large-sized robot having a larger conveyable mass in comparison with the actual mass of the end effecter is selected in order to secure a larger range of movement. In such cases, if a smaller reduction ratio in comparison with the mass of the end effecter is selected, a large-sized robot can be operated at a high speed.

Next, a description is given of alternation of the reduction ratio of the first servomotor with a speed reducer, which drives the lower arm 3.

The distance from the center of rotation of the L axis to the center of gravity of the load mass 5 in the status shown in FIG. 2(a), that is, the length X2 of a lever of a gravity moment loaded onto the first servomotor 8 with a speed reducer by the load mass becomes long so as to be X2' in the status shown in FIG. 2(b). Also, the length of the above-described lever becomes 0 in the status shown in FIG. 2(c).

The moment of a gravity loaded onto the first servomotor with a speed reducer by the load mass 5 is thus maximized when the statuses of the lower arm 3 and upper arm 4 are horizontal, and becomes 0 when both of the statuses of the lower arm 3 and the upper arm 4 are erect.

Therefore, an instruction for varying the reduction ratio of the first servomotor 8 with a speed reducer is issued to the robot controlling apparatus in response to the angle with respect to the statuses of the lower arm 3 and the upper arm 4, that is, reference status (usually, either one of the horizontal status or erect status may be used as the reference status).

Also, the moment of gravity loaded onto the first servomotor 8 with a speed reducer is calculated on the basis of the statuses of the lower arm 3 and the upper arm 4, and the reduction ratio may be varied in response to the size of the result thereof.

As in the above, the reduction ratio of the second servomotor 9 with a speed reducer, which drives the upper arm 4, may be varied.

In the status shown in FIG. 2(a), the length of a lever of gravity loaded onto the second servomotor 8 with a speed reducer by the load mass 5 is expressed in terms of X2. However, in the status shown in FIG. 2(c), the length of the above-described lever becomes 0.

The moment of gravity loaded onto the second servomotor 9 with a speed reducer by the load mass 5 is maximized when the status of the upper arm 4 is horizontal, and becomes 0 when the upper arm 4 is erect.

Therefore an instruction for varying the reduction ratio of the second servomotor 9 with a speed reducer in response to the angle with respect to the status of the upper arm 4, that is, reference status (usually, either one of the horizontal status or erect status may be used as the reference) is issued to the robot controlling apparatus.

In addition, in a case where the moment of gravity loaded onto the motor varies at the beginning point of movement of the robot and at the termination point thereof, the reduction ratio may be selected on the basis of a larger load. As a matter of course, an intermediate point is defined between the beginning point and the termination point, wherein the robot may be once stopped at the intermediate point to change the reduction ratio. However, this is not necessarily advantageous in view of an increase in time required to change the reduction ratio and a loss of time resulting from speed deceleration and acceleration.

The above-described method for varying the reduction ratio is based on the statuses of the respective arms of a vertical multi-joint robot, and is based on a static force balance. However, because a plurality of axes are simultaneously operated in an actual robot, torque resulting from interference of respective axes is generated, wherein there is a case where the load of the drive motor cannot be obtained only by the static force balance.

Therefore, a description is given of a method for determining a schedule for varying the reduction ration of a speed reducer based on a fluctuation Of the load of the motor by actually operating the robot and obtaining the fluctuation in the load of the motor.

(1) First, an appointed operation course the robot (For example, a course passing through respective teaching points from A to F like A→B→C→D→E→F).

(2) The reduction ratios of the respective axes are set to larger values, and the robot is operated for playback in compliance with the course previously taught to the robot. At this time, the speed, torque and current of the motor are recorded.

(3) A schedule for varying the reduction ratio is determined in compliance with a fluctuation in the torque of the motor, which has previously been recorded. For example, when the torque of the motor fluctuates such as Large→Large→Small→Small→Large→Small in the course from A to F, a schedule for changing the reduction ratio at the respective teaching points from A to F in order of Large→Large→Small→Large→Large→Small is programmed.

(4) The robot is played back based on the program in which the schedule for changing the reduction ratio is incorporated, and the speed, torque and current of the motor are recorded.

(5) Unless the speed, torque and current of the motor exceed the limits, the process is terminated. If any one of these exceeds the limit, steps from (3) through (5) are repeated.

Also, if the steps from (1) through (5) are executed in simulation in a computer, not dependent upon an actual robot, that is, in so-called off-line teaching software, there is no case where the robot overruns or the motor is not burned out even if the speed, torque and current of the motor exceed the ratings during the playback. Steps (1) through (5) can be repeated until the schedule for changing the reduction ratio is converged to the optimal.

Further, in the above-described embodiment, a two-stage variable speed reducer is employed, in which a large reduction ratio and a small reduction ratio can be selected in the speed reducer. However, the present invention is not limited to the two-stage variable speed reducer, wherein it is needless to say that three or more stages of the variable speed reducer may be employed or a valiable-free speed reducer may be also employed.

As described above, according to the invention, since the reduction ratio of the speed reducer can be optimally varied in response to a load of the respective drive shaft based on the status of the robot and the size of a mass of the end effecter, power of the drive motor can be fully brought about. Therefore, the robot can be operated at a high speed.

The present invention is effective as a robot that is driven by an electric motor via a speed reducer, in particular as a vertical multi-joint robot, and as a method for controlling the same.

What is claimed is:

1. A robot driven by a motor via a speed reducer, wherein said speed reducer is a variable speed reducer whose reduction ratio is variable during a playback motion of said robot, and the reduction ratio of said speed reducer is varied according to the angle of said robot arm.

2. A robot driven by a motor via a speed reducer, wherein said speed reducer is a variable speed reducer whose reduction ratio is variable during a playback motion of said robot, and the reduction ratio of said speed reducer is varied according to the size of a load mass attached to the tip end of said robot arm.

3. A robot driven by a motor via a speed reducer, wherein said speed reducer is a variable speed reducer whose reduction ratio is variable during a playback motion of said robot, and the reduction ratio of said speed reducer is varied according to the intensity of a rotational inertia around the drive shaft of said robot.

4. A method for controlling a robot, driven by a motor via a variable speed reducer whose reduction ratio is variable during a playback motion, comprising the steps of: teaching appointed operation courses to acquire fluctuations in a rotational inertia around the drive shaft of said robot and in an angle of said robot arm, and determining a schedule for varying said speed reducer which is determined by the fluctuations in a load of said motor resulting from the fluctuations in the rotational inertia and the angle of said arm.

5. A method for controlling a robot, comprising the steps of:

teaching said robot appointed operation courses by an off-line teaching device;

acquiring fluctuations in the rotational inertia around the drive shaft of said robot and angle of said robot arm by simulation brought about by said off-line teaching device; and determining a schedule for varying a reduction ratio of a speed reducer in compliance with the fluctuations in the load of said motor resulting from the rotational inertia and the angle of said arm.

* * * * *